US012650670B2

(12) United States Patent 
Braun et al.

(10) Patent No.: US 12,650,670 B2 
(45) Date of Patent: Jun. 9, 2026

(54) INTERFACE DEVICE FOR CONNECTING PROCESS CONTROLLERS TO OPC UA PEER DEVICES

(71) Applicant: ABB Schweiz AG, Baden (CH)

(72) Inventors: Roland Braun, Niederkassel Lülsdorf (DE); Mario Hoernicke, Landau (DE)

(73) Assignee: ABB Schweiz AG, Baden (CH)

( * ) Notice: Subject to any disclaimer, the term of this patent is extended or adjusted under 35 U.S.C. 154(b) by 447 days.

(21) Appl. No.: 18/315,585

(22) Filed: May 11, 2023

(65) Prior Publication Data

US 2023/0280710 A1 Sep. 7, 2023

Related U.S. Application Data

(63) Continuation of application No. PCT/EP2021/075375, filed on Sep. 15, 2021.

(30) Foreign Application Priority Data

Nov. 12, 2020 (EP) ..................................... 20207190

(51) Int. Cl. 
*G05B 19/042* (2006.01)

(52) U.S. Cl. 
CPC ..... *G05B 19/0423* (2013.01); *G05B 19/0428* (2013.01)

(58) Field of Classification Search 
CPC .................... C12N 15/86; C12N 13/00; C12N 2750/14143; C07K 14/4702; 
(Continued)

(56) References Cited

U.S. PATENT DOCUMENTS 9,170,579 B1 10/2015 Witter et al. 
2012/0163235 A1* 6/2012 Ho ........................ H04L 67/104 
370/254

(Continued)

FOREIGN PATENT DOCUMENTS

CN 107548475 A 1/2018 
CN 107567604 A 1/2018 
(Continued)

OTHER PUBLICATIONS

European Patent Office, International Preliminary Report on Patentability in International Patent Application No. PCT/EP2021/075375, 11 pp. (Nov. 9, 2022). 
(Continued)

*Primary Examiner* — Kidest Worku 
(74) *Attorney, Agent, or Firm* — Fitch Even Tabin & Flannery LLP

(57) ABSTRACT

A system and method for connecting a process controller to one or more peer devices includes providing a process controller interface for bidirectional communication; using a peer device interface for bidirectional OPC UA communication with the peer devices; and providing a logic unit that determines one or more to-be-performed actions from the one or more inputs according to a predetermined logic; 
(Continued)

determines, according to the predetermined logic, one or more outputs which, when supplied to the process controller, and/or to the peer devices, cause the to-be-performed actions to be performed; and supply these outputs to the process controller, and/or to the one or more peer devices.

18 Claims, 1 Drawing Sheet

(58) Field of Classification Search
CPC ............ C07K 2319/55; C07K 2319/60; C07K 14/43581; A61M 37/0092; A61N 2007/0026
See application file for complete search history.

(56) References Cited

U.S. PATENT DOCUMENTS

| | | | | |
|---|---|---|---|---|
| 2014/0012913 | A1* | 1/2014 | Varoglu | H04W 76/14 |
| | | | | 709/204 |
| 2017/0147022 | A1 | 5/2017 | Zhang et al. | |
| 2018/0321662 | A1* | 11/2018 | Nixon | G06F 13/4072 |
| 2018/0347842 | A1 | 12/2018 | Zhang et al. | |
| 2020/0210869 | A1 | 7/2020 | Anicic et al. | |

FOREIGN PATENT DOCUMENTS

| | | |
|---|---|---|
| CN | 109257208 A | 1/2019 |
| IN | 201727033079 A | 12/2017 |
| WO | WO 2009/083133 A1 | 7/2009 |
| WO | WO 2016/155856 A1 | 10/2016 |

OTHER PUBLICATIONS

European Patent Office, International Search Report in International Patent Application No. PCT/EP2021/075375, 3 pp. (Dec. 21, 2021).
European Patent Office, Written Opinion in International Patent Application No. PCT/EP2021/075375, 7 pp. (Dec. 21, 2021).
European Patent Office, Extended European Search Report in European Patent Application No. 20207190.8, 10 pp. (May 3, 2021).
The Patent Office of the People's Republic of China, Office Action in Chinese Patent Application No. 202180076290.6, 10 pp. (Nov. 9, 2023).

* cited by examiner

INTERFACE DEVICE FOR CONNECTING PROCESS CONTROLLERS TO OPC UA PEER DEVICES

CROSS-REFERENCE TO RELATED APPLICATIONS

The present application claims priority to International Patent Application No. PCT/EP2021/075375, filed on Sep. 15, 2021, and to European Patent Application No. 20207190.8, filed on Nov. 12, 2020, each of which is incorporated herein in its entirety by reference.

FIELD OF THE DISCLOSURE

The present disclosure relates to managing communications between process controllers and peer devices for the purpose of industrial process automation.

BACKGROUND OF THE INVENTION

Automated industrial plans typically comprise many field devices that are in a direct relationship with an industrial production process. These field devices are controlled by one or more process controllers. While several different kinds and architectures of fieldbuses have been used in the past to connect the field devices to the process controllers, many "industry 4.0" concepts assume that communication between process controllers and field devise will converge on IP communication in combination with Open Platform Communications Unified Architecture, OPC UA. Client-server architectures for OPC UA communications are known from WO 2009/083 133 A1.

Much of the functionality of OPA UA field devices is provided by means of "methods" of the respective devices that are to be called by the process controller. For example, if a function of an actuator field device enables to control a valve, a call to a respective method "move" allows to position the piston of the valve. Field devices may implement many more actions (like "shutdown" or "reset") that may be triggered by calling respective methods.

US 2018/347 842 A1 discloses a method that generates a native node and a foreign node that includes a foreign data structure that is defined with a foreign protocol and that represents information of a foreign device in a foreign namespace. The method links the native node and the foreign node in a native namespace and foreign namespace by a translation function.

US 2020/210 869 A1 discloses a gateway for facilitating an integration of process equipment within an industrial environment supporting an open industry standard. Field devices having characteristics, capabilities and/or requirements that are expressed by a description language for industrial process equipment such as EDDL are integrated into a contemporary communication environment enabling a direct data access.

WO 2016/155 856 A1 discloses a system and method for process controlling of plants and plant control systems by beams of an OPC UA based Machine-to-Machine network. For steering and controlling the plant, the process control system transmits programmable logic controller command messages to the plant control system by encoding the PLC command messages for the OPC UA transport layer and transmitting it in the OPC UA transport layer by means of a defined bit sequence.

U.S. Pat. No. 9,170,579 B1 discloses a digital energy system that monitors and controls a plurality of industrial energy devices. A server monitors industrial energy devices by obtaining values for one or more variables. To control an industrial energy device, the server sends a write request for the industrial energy device to an interface device with a value for a defined variable in a device definition for the industrial energy device.

BRIEF SUMMARY OF THE INVENTION

In one general aspect, the present disclosure facilitates the automation of a plant with multiple field devices, and/or increases the utilization of the functionality provided by each field device, particularly in a setting where the process controller is not aware of the complete set of OPC UA methods that is implemented on the side of the field device. Embodiments of an interface device with a process controller interface, a peer device interface and a logic unit are described herein. The disclosure generally describes an interface device for connecting at least one process controller to one or more peer devices.

Such peer devices may be field devices. Such field devices may be devices that are in direct interaction with an industrial process. For example, the field devices may comprise measurement instrument that measures a physical quantity in the industrial process, such as a temperature, a pressure, a voltage, an amperage or a concentration of at least one substance.

The peer devices may also be other process controllers, such as programmable logic controllers, PLC. For example, a process control system may be segmented into relatively autonomous PLC-based subsystems. A central process controller may then, for example, communicate with these subsystems to orchestrate the process as a whole.

The role of the process controller may, for example, be to orchestrate the operation of one or more peer devices of whatever kind towards a particular goal. For example, a low-level controller may have the job of actuating one or more field devices such that a certain quantity, such as a temperature or a pressure measured by another field device, is maintained at a given set-point. A higher-level controller may in turn control those given set-points such that another goal for the industrial process is met.

The interface device comprises a process controller interface for bidirectional communication with the process controller. The interface device further comprises a peer device interface for bidirectional OPC UA communication with the peer devices. In particular, the peer device interface and the process controller interface may be physically distinct interfaces, and/or they may operate according to different communication standards. But this is not required. Rather, both interfaces may operate according to the same communication standard and even within the same network. For example, if both the process controller and the peer device speak OPC UA and are connected to the same Ethernet network, the process controller interface and the peer device interface may be distinct virtual network interfaces on a same underlying physical Ethernet card.

The interface device comprises a logic unit. This logic unit implements a kind of "if-this-then-that" (IFTTT) logic. In response to one or more inputs from the process controller, and/or from the one or more peer devices, meeting one or more predetermined conditions, the logic unit determines one or more to-be-performed actions from the one or more inputs according to a predetermined logic. For example, such action may comprise communicating data that has been received from the process controller, respectively from the peer device, to the peer device, respectively to the process controller. The action may also comprise to cause the peer device to alter the course of the industrial process somehow.

The logic unit determines, according to the predetermined logic, one or more outputs which, when supplied to the process controller, and/or to the peer devices, cause the to-be-performed actions to be performed. For example, if the communicating of data between the process controller and the peer device is to be mediated and/or brokered, some sort of translation of the data may be involved on a physical layer and/or on a logical layer. If the course of the physical process is to be altered, the logic unit may transform this desire into one or more concrete commands that need to be issued to the peer device, such as a field device.

The determined outputs are supplied to the process controller, and/or to the one or more peer devices. For example, if a method provided by an OPC UA peer device is to be invoked, the output may be a call instruction that causes invocation of this method when supplied to an application programming interface, API, of the peer device. Even if the peer device is also a process controller, such as a PLC, there may be a situation where the two process controllers speak different languages and need the interface device for mutual communication.

DETAILED DESCRIPTION OF THE INVENTION

Figure 1:
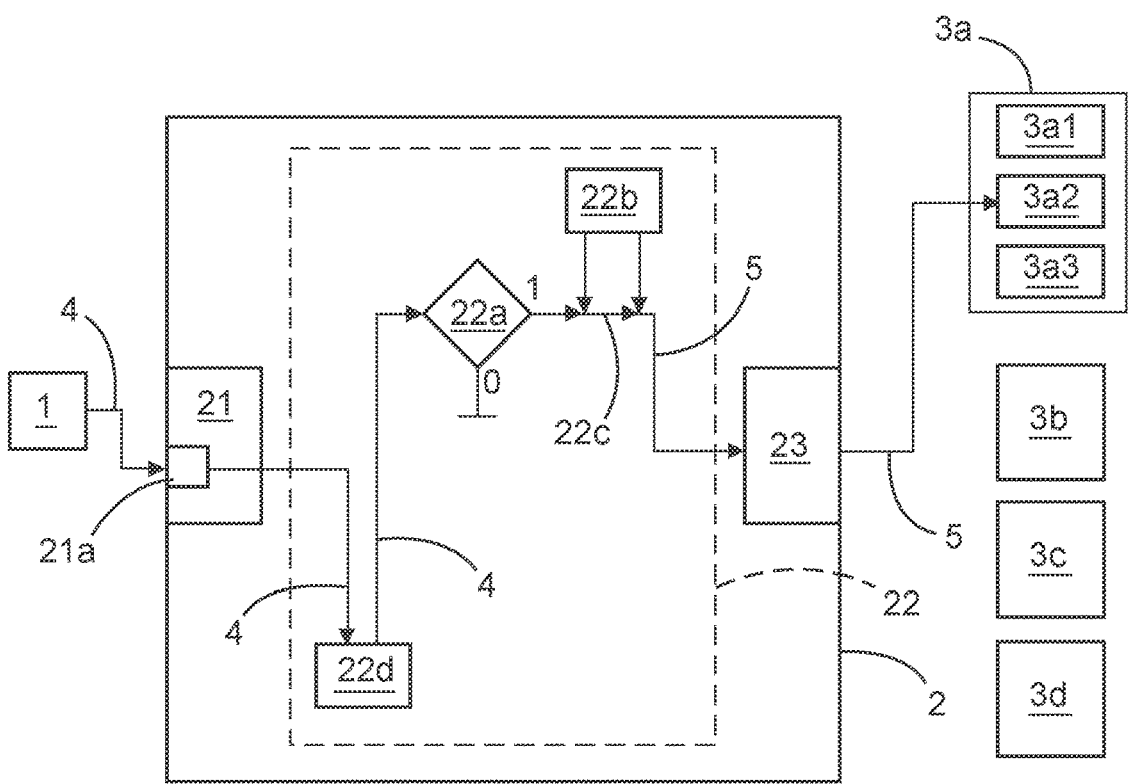
FIG. 1 is a functional diagram of an interface device in communication with a process controller and multiple peer devices in accordance with the disclosure.
Figure 2:
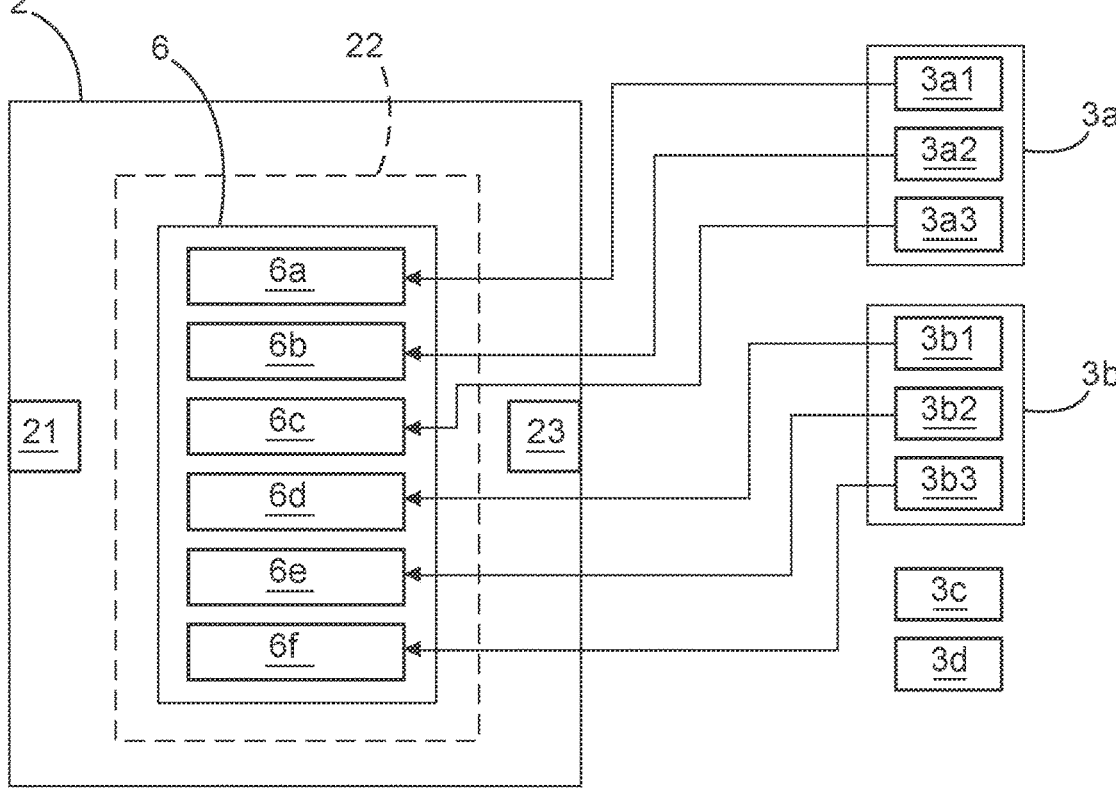
FIG. 2 is a diagram containing mapping of methods for multiple peer devices to handles in a common namespace in accordance with the disclosure.

FIG. 1 shows an embodiment of an interface device 2 in communication with a process controller 1 and multiple peer devices 3a-3d; FIG. 2 shows exemplary mapping of methods 3a1-3a3, 3b1-3b3 of multiple peer devices 3a-3d to handles 6a-6f in a common namespace 6.

More specifically, FIG. 1 shows an exemplary embodiment of the interface device 2 in a setting where it is in communication with a process controller 1 and multiple peer devices 3a-3d. For clarity, FIG. 1 only shows one direction of communication: An input 4 is provided by the process controller 1, and this ultimately results in an output 5 being transmitted to one or more peer devices 3a-3d. But it is also possible that an input 4, like a message of a subscribed message topic, is provided by one or more peer devices 3a-3d and results in an output 5 being transmitted to the process controller 1.

The interface device 2 comprises a process controller interface 21 that is connectable to the process controller 1, a logic unit 22 and a peer device interface that is connectable to the peer devices 3a-3d, e.g., via an Ethernet network.

In the example shown in FIG. 1, the process controller interface comprises an I/O port 21a that may be written to and read from by the process controller 1 in a data-driven manner. The I/O port 21a is mapped to a variable 22d of the logic unit 22. That is, an input 4 written to the I/O port 21a updates the variable 22d, and the current value of the variable 22d may be queried by reading from I/O port 21a.

The input 4 is checked against condition 22a in logic unit 22. If the condition is fulfilled (truth value 1), one or more to-be-performed actions 22c are determined from the input 4 based on predetermined logic 22b. The predetermined logic 22b also converts the to-be-performed actions 22c into an output 5 that is then sent to the appropriate peer device 3a-3d. In the example shown in FIG. 1, the to-be-performed action 22c comprises invoking method 3a2 of peer device 3a1 that provides methods 3a1, 3a2 and 3a3. Consequently, the output 5 comprises a call instruction to the method 3a2.

FIG. 2 illustrates the aggregation of multiple methods 3a1-3a3, 3b1-3b3 provided by several peer devices 3a-3d into one single OPC UA namespace 6 within logic unit 22. Each method 3a1-3a3, 3b1-3b3 is mapped to one handle 6a-6f in the unified namespace 6. One effect of this aggregation is that a process controller 1 does not need to know on which peer device 3a-3d the to-be-invoked method 3a1-3a3, 3b1-3b3 is implemented.

In the embodiments described herein, the interface device introduces a layer of abstraction between the peer device and the process controller. For example, such abstraction facilitates communication in case either the process controller or the peer device is upgraded to a respective new device. For example, process controllers on the one hand and field devices as peer devices on the other hand typically have different lifecycles and physical lifetimes. Therefore, they are quite likely to fall due for replacement at different times. Because the devices frequently have a longer physical life than it corresponds to their innovation lifecycle, at a time where the device falls due for replacement, its manufacturer may already have switched to marketing a newer model, phasing out the old model. If the plant operator no longer has a spare of the old model in stock, he may be faced with a choice between finding a secondary source from where the old model may still be bought at a higher price, or buying a newer model and making adaptations to the device that he continues to use. For example, if a field device is replaced with a new model, the new model may have different capabilities, and a different syntax may be required to interact with it. If a process controller is replaced with a new model, the new process controller may expect certain modern features to be present in field devices and may not be aware of legacy field devices that lack these modern features.

The interface device provides a place where the adaptations may be made, so that no changes need to be made to the process controller or to the field device that is still used even after the respective other device has been replaced. Depending on the age of the respective devices, it may be a lot easier to translate the output of one device for the use by the other device than it is to make the one device provide matching output for the other device in the first place.

In particular, one single interface device may translate between one or more process controllers and a plurality of peer devices. So there is only one place where something needs to be changed even if multiple process controllers and peer devices are involved.

In a particularly advantageous embodiment, the process controller interface comprises at least one I/O port that is mapped to a variable of the logic unit. Upon a write request to the I/O port by the process controller, the process controller interface reads an input written to the I/O port by the process controller and updates the value of the variable according to this input. The logic unit may then use the value of the variable in any suitable manner when communicating with the peer device. For example, from the input written to the I/O port by the process controller, a call to at least one UPC UA method of a field device as a peer device may be determined as a to-be-performed action through the predetermined logic of the logic unit. For example, the logic unit may determine, from the I/O port to which the write request was made, a parameter of the field device that the process controller intends to set and call the OPC UA method of the field device that is to be used to set this parameter, with the input written to the I/O port as an argument. In the same manner, parameters of a process controller as a peer device may be set. For example, a superordinate process controller may set a set-point in a lower-level process controller.

Likewise, upon a read request to the I/O port by the process controller, and/or upon an update to the variable by the logic unit, the logic unit supplies the value of the variable to the process controller by means of the I/O port. In particular, the logic unit may determine, by virtue of its predetermined logic, from the read request to the I/O port by the process controller, a call to at least one OPC UA method of a peer device that causes an update of the variable as a to-be-performed action. For example, the logic unit may determine, from the I/O port to which the read request was made, a parameter of the peer device that the process controller intends to read. The logic unit may then call the OPC UA method of the peer device that is to be used to read this parameter, store the returned parameter in the variable, and deliver this to the process controller via the I/O port.

In this manner, the interface devices enable even process controllers that have only I/O ports available for inputting and outputting of data and are thus purely data-driven, and not aware of OPC UA in any way, to communicate with OPC UA peer devices. There is no limitation as to which features of the peer device a process controller may use, as long as the interface provides some mapping between data exchanged through the I/O port and the respective to-be-performed actions on the OPC UA peer device.

For example, the method of the OPC UA device that is called may be encoded in the input written to the I/O port by the process controller, or in the value of the variable derived therefrom. Therefore, in a further particularly advantageous embodiment, in response to determining that said input or said variable meets or exceeds a predetermined threshold, the logic unit may determine a call to a first OPC UA method of a peer device as a to-be-performed action. In response to determining that said input, and/or said variable, does not meet said predetermined threshold, the logic unit may determine a call to a second OPC UA method of a peer device as a to-be-performed action.

From the perspective of the process controller, the interface device acts somewhat akin to a telephone computer that enables a customer who only has a touch-tone telephone to perform arbitrary actions on the available peer devices. Figuratively speaking, the process controller dials the interface device and is greeted with a menu like, "Welcome to the peer devices in this plant. To list available peer devices, press 1. To read data from a particular peer device, press 2. To change a parameter on a particular peer device, press 3 . . . "

For example, this may be realized in the predetermined logic of the logic unit by means of an "if . . . then . . . else" control structure or a "case" control structure with respect to an input written to the I/O port.

In a further particularly advantageous embodiment, the logic unit is further configured to subscribe to at least one message topic published by the at least one peer device in a publish-subscribe model and determine one or more to-be-performed actions in response to receiving a message of the subscribed message topic. For example, the logic unit may forward information from the received message to a process controller that has previously instructed the logic unit to subscribe to said message topic. The instruction to subscribe and the obtained published information may be conveyed back and forth between the process controller and the interface device in any suitable manner. Even pure data-driven communication via inputs written to I/O ports and outputs read back from I/O ports is sufficient.

In particular, one and the same published message topic of a peer device may be of interest to several process controllers. Published messages will then need to travel across the network to the interface device only once and can then be distributed onwards to the process controllers that are interested in them.

Likewise, if multiple process controllers are interested in the value of one and the same parameter of a peer device, the interface device needs to call a method of the peer device to obtain an updated value of this parameter only once. The updated value may then be stored in a variable of the logic unit and distributed further to any process controller that needs it. The interface device has control over the frequency with which an updated value of the parameter is obtained from the peer device, no matter how frequently the process controller requests this parameter. In this manner, the load on the OPC UA servers within the peer devices may be throttled. For example, field devices as peer devices are typically low-power devices with limited compute and networking resources. Therefore, their OPC UA servers may be equipped to handle a few simultaneous requests at most. The interface device may have much more powerful compute and networking resources, so it does not matter if this receives a lot more requests.

The to-be-performed actions that the logic unit determined in response to an input from the process controller, and/or from the peer devices, may, for example comprise: obtaining at least one measurement value or value of an operational parameter from at least one field device; and/or setting at least one operational parameter of at least one field device; and/or causing the field device to exert at least one physical influence on the performing of an industrial process in which the field device participates.

The actions are not limited to these or other primitives. Rather, in response to one single input or constellation of inputs, a whole sequence of actions may unfold by virtue of the predetermined logic of the logic unit. For example, in response to a process controller signaling that a vessel needs to be purged, the interface device may orchestrate a repeated filling and draining of the vessel by actuating various valves and continue to do so until the concentration of a particular substance drops below a pre-set threshold value.

The functionality of the interface device is not limited to facilitating what was previously done in the cooperation between the process controller and the one or more peer devices. Rather, new functionality may be added. In a further advantageous embodiment, the predetermined conditions evaluated by the logic unit may comprise, as a prerequisite for at least one to be-performed action, at least one interlock condition for a physical state variable in an industrial plant that comprises the peer device. For example, if the process controller outputs the instruction to turn on an electron beam evaporator or a mass spectrometer on a vacuum chamber in which thin films are manufactured, the interface device may read out an OPC UA pressure gauge field device on the chamber in order to check whether the vacuum in the chamber is sufficient. If the electron beam evaporator or the mass spectrometer is operated without a sufficiently good vacuum, it may suffer damage.

Likewise, the one or more outputs that the predetermined logic determines may also be based on information obtained from multiple peer devices. For example, the predetermined logic may aggregate measurement values from multiple temperature sensors to form an average temperature that is then communicated to the process controller.

In a further advantageous embodiment, the logic unit is further configured to map OPC UA methods provided by multiple peer devices to handles within one common OPC UA namespace. In response to an input from the process controller that is indicative of an intention to call such a handle, it may then determine a call to the corresponding OPC UA method of a peer device as a to-be-performed action. In this manner, the process controller is relieved from having to know in which namespace the method resides. In particular, it is often not important which of several available peer devices perform a specific action; rather, what matters is that the action is performed. For example, if three parallel pumps are available for draining a vessel, but only the capacity of one pump is needed, the logic unit may choose in a "round-robin" manner which pump to use, so as to distribute the wear and tear more equally across the pumps.

In a further particularly advantageous embodiment, the logic unit is configured to accept interpretable, compileable or executable code, such as Python code, and use this as predetermined logic for determining to-be-performed actions, and/or for determining outputs for performing these actions. This provides a further flexibility for the user to adapt the interface device to a particular plant. For example, the logic may be adapted to interface between a particular legacy process controller that only supports data-driven communications over a plurality of I/O ports and a constellation of modern OPC UA peer devices.

The interface device may be implemented on one or more computers with appropriate hardware interfaces for communicating with the process controller and with the peer devices. For example, most computers already come with an Ethernet interface that may be used to communicate with OPC UA peer devices. For communicating with process controllers that use data-driven I/O, an appropriate hardware interface may be connected to the computer as an interface card or plugged in to the computer via a Thunderbolt or USB connection. The main functionality of the interface device may then be embodied in software. Therefore, the invention also relates to a computer program with machine-readable instructions that, when executed by one or more computers, upgrade the one or more computers to the interface device described above.

The computer program may, for example, be marketed on a non-transitory computer-readable storage medium or in the form of a download product that, e.g., allows instant fulfillment after a purchase in an online store. Therefore, the invention also relates to a non-transitory computer-readable storage medium or a download product with the computer program. The invention also relates to one or more computers with the computer program, and/or with the non-transitory computer storage medium and/or download product.

LIST OF REFERENCE SIGNS 1 process controller
2 interface device
21 process controller interface of interface device 2
21a I/O port in process controller interface 21
22 logic unit of interface device 2
22a predetermined condition for determining actions 22c
22b predetermined logic for determining actions 22c, output 5
22c to-be-performed actions in response to input 4
22d variable in logic unit 22

23 peer device interface of interface device 2
3a-3d peer devices
3a1-3a3 exemplary methods provided by peer device 3a
3b1-3b3 exemplary methods provided by peer device 3b
4 input to interface device 2
5 output from interface device 2
6 unified OPC UA namespace
6a-6f handles in namespace 6a-6f for methods 3a1-3a3, 3b1-3b3

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An interface device for connecting at least one process controller to one or more peer devices, comprising:
   a process controller interface for bidirectional communication with the process controller;
   a peer device interface for bidirectional Open Platform Communication Unified Architecture (OPC UA) communication with the peer devices; and a logic unit that is configured to, in response to one or more inputs from the process controller, and/or from the one or more peer devices, meeting one or more predetermined conditions:

determine one or more to-be-performed actions from the one or more inputs according to a predetermined logic;

determine, according to the predetermined logic, one or more outputs which, when supplied to the process controller, and/or to the peer devices, cause the to-be- performed actions to be performed; and supply the one or more outputs to the process controller, and/or to the one or more peer devices:

wherein the process controller interface comprises at least one I/O port that is mapped to a variable of the logic unit and wherein the process controller interface is configured to enable a process controller that has only I/O ports available for inputting and outputting of data and is thus purely data driven and is not aware of OPC UA communications, to communicate with the OPC UA peer devices by:

upon a write request to the I/O port by the process controller, reading an input written to the I/O port by the process controller, and updating the value of the variable according to the input; and upon a read request to the I/O port by the process controller, and/or upon an update to the variable by the logic unit, supplying the value of the variable to the process controller by means of the I/O port.

2. The interface device of claim 1, wherein the predetermined logic comprises:

determining, from the input written to the I/O port by the process controller, a call to at least one OPC UA method of a peer device as a to-be-performed action; and/or determining, from the read request to the I/O port by the process controller, a call to at least one OPC UA method of a peer device that causes an update of the variable as a to-be-performed action.

3. The interface device of claim 1, wherein the logic unit is configured to:

in response to determining that the variable, and/or the input written to the I/O port by the process controller, meets or exceeds a predetermined threshold, determine a call to a first OPC UA method of a peer device as a to-be-performed action; and in response to determining that the variable, and/or the input written to the I/O port by the process controller, does not meet said predetermined threshold, determine a call to a second OPC UA method of a peer device as a to-be-performed action.

4. The interface device of claim 1, wherein the logic unit is further configured to subscribe to at least one message topic published by the at least one peer device in a publish-subscribe model, and determine one or more to-be-performed actions in response to receiving a message of the subscribed message topic.

5. The interface device of claim 4, wherein the one or more to-be- performed actions comprise(s) updating the value of a variable of the logic unit based on the received message of the subscribed message topic.

6. The interface device of claim 1, wherein the to-be-performed actions comprise:

obtaining at least one measurement value or value of an operational parameter from at least one field device; and/or setting at least one operational parameter of at least one field device; and/or causing the field device to exert at least one physical influence on the performing of an industrial process in which the field device participates.

7. The interface device of claim 1, wherein the one or more predetermined conditions comprise, as a prerequisite for at least one to-be-performed action, at least one interlock condition for a physical state variable in an industrial plant that comprises the peer device.

8. The interface device of claim 1, wherein the predetermined logic comprises determining the one or more outputs based on information obtained from multiple peer devices.

9. The interface device of claim 1, wherein the logic unit is further configured to map OPC UA methods provided by multiple peer devices to handles within one common OPC UA namespace, and determine, in response to an input from the process controller that is indicative of an intention to call such a handle, a call to the corresponding OPC UA method of a peer device as a to-be-performed action.

10. The interface device of claim 1, wherein the logic unit is configured to accept interpretable, compileable or executable code and use the interpretable, compileable or executable code as predetermined logic for determining to-be-performed actions, and/or for determining outputs for performing the to-be-preformed actions.

11. A method for connecting at least one process controller to one or more peer devices using an interface device, the method comprising:

providing a process controller interface for bidirectional communication with the process controller;

providing a peer device interface for bidirectional OPC UA communication with the peer devices; and providing a logic unit that is configured to, in response to one or more inputs from the process controller, and/or from the one or more peer devices, meeting one or more predetermined conditions:

determine one or more to-be-performed actions from the one or more inputs according to a predetermined logic;

determine, according to the predetermined logic, one or more outputs which, when supplied to the process controller, and/or to the peer devices, cause the to-be-performed actions to be performed; and supply the one or more outputs to the process controller, and/or to the one or more peer devices;

wherein the process controller interface comprises at least one I/O port that is mapped to a variable of the logic unit and wherein the process controller interface is configured to enable a process controller that has only I/O ports available for inputting and outputting of data and is thus purely data driven and is not aware of OPC UA communications, to communicate with the OPC UA peer devices by:

upon a write request to the I/O port by the process controller, reading an input written to the I/O port by the process controller, and updating the value of the variable according to the input; and upon a read request to the I/O port by the process controller, and/or upon an update to the variable by the logic unit, supplying the value of the variable to the process controller by means of the I/O port.

12. The method of claim 11, wherein the predetermined logic comprises:

determining, from the input written to the I/O port by the process controller, a call to at least one OPC UA method of a peer device as a to-be-performed action; and/or determining, from the read request to the I/O port by the process controller, a call to at least one OPC UA method of a peer device that causes an update of the variable as a to-be-performed action.

13. The method of claim 11, wherein the logic unit is configured to:

in response to determining that the variable, and/or the input written to the I/O port by the process controller, meets or exceeds a predetermined threshold, determine a call to a first OPC UA method of a peer device as a to-be-performed action; and in response to determining that the variable, and/or the input written to the I/O port by the process controller, does not meet said predetermined threshold, determine a call to a second OPC UA method of a peer device as a to-be-performed action.

14. The method of claim 11, wherein the logic unit is further configured to subscribe to at least one message topic published by the at least one peer device in a publish-subscribe model, and determine one or more to-be-performed actions in response to receiving a message of the subscribed message topic.

15. The method of claim 14, wherein the one or more to-be-performed actions comprise(s) updating the value of a variable of the logic unit based on the received message of the subscribed message topic.

16. The method of claim 11, wherein the to-be-performed actions comprise:

obtaining at least one measurement value or value of an operational parameter from at least one field device; and/or setting at least one operational parameter of at least one field device; and/or causing the field device to exert at least one physical influence on the performing of an industrial process in which the field device participates.

17. The method of claim 11, wherein the one or more predetermined conditions comprise, as a prerequisite for at least one to-be-performed action, at least one interlock condition for a physical state variable in an industrial plant that comprises the peer device.

18. The method of claim 11, wherein the predetermined logic comprises determining the one or more outputs based on information obtained from multiple peer devices.

\* \* \* \* \*